Feb. 16, 1960 M. W. MAYER 2,925,377
ISOTHERMAL CATALYTIC REFORMING
Filed April 1, 1955
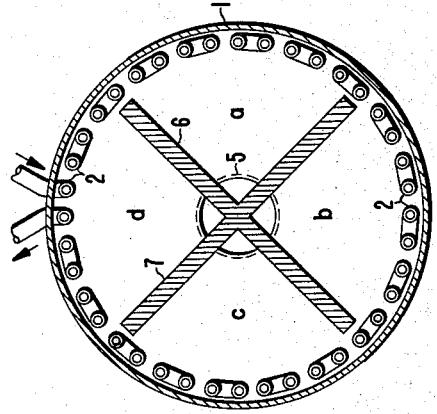
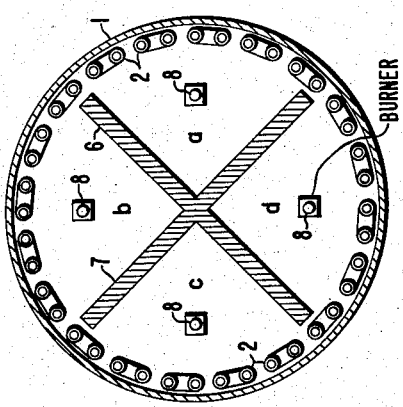
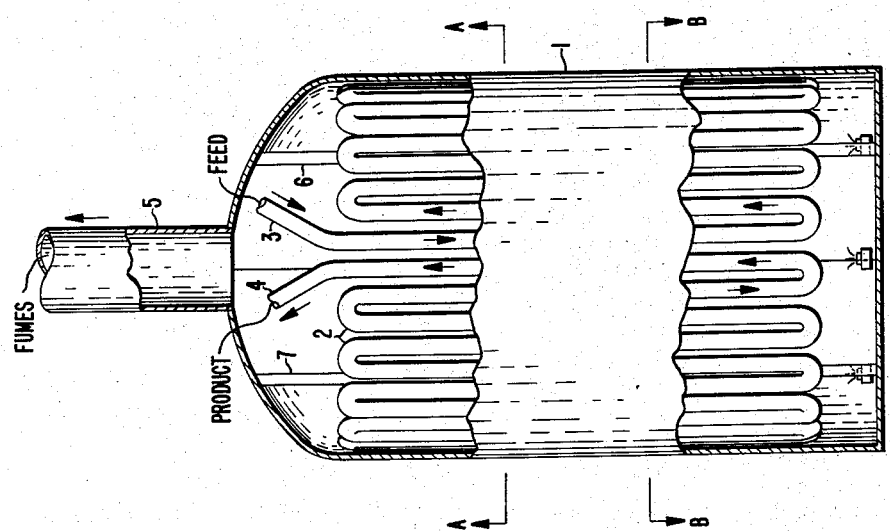
MAURICE W. MAYER INVENTOR
BY J. Cushman ATTORNEY

United States Patent Office 2,925,377
Patented Feb. 16, 1960

2,925,377

ISOTHERMAL CATALYTIC REFORMING

Maurice W. Mayer, Summit, N.J., assignor to Esso Research and Engineering Company, a corporation of Delaware Application April 1, 1955, Serial No. 498,569

5 Claims. (Cl. 208—138)

The present invention relates to improvements in catalytic hydroforming. More particularly, the present invention relates to improvements in hydroforming going to the matter of carrying out the process so that it is conducted under conditions most suitable and economic in relatively small scale units.

It is generally known that hydroforming is a highly endothermic reaction, since among other chemical reactions occurring in the process, naphthenes are dehydrogenated. Because the hydroforming operation is so highly endothermic, one of the principal problems, if not the most serious problem, is the matter of supplying heat to the hydroforming reaction to support the same. As the hydroforming process is conducted in conventional fixed bed operations, the naphtha to be reformed is preheated in a tubular furnace, admixed with a hydrogen-containing "recycle" gas also heated in a tubular furnace, and the mixture is charged to the first of a series of adiabatic reaction vessels each containing a fixed bed of a suitable catalyst. The effluent from the first reactor is then passed through a reheat furnace where sufficient heat is supplied to compensate for the heat loss occasioned by the endothermic reaction that has taken place in the first reactor vessel, so that the temperature is restored to or near the temperature level at which it entered the first reactor. The reheated mixture is then passed into a second reaction vessel and, if necessary, the effluent therefrom is passed into a second reheat furnace and thence into a third vessel, and so on. The number of reheat stages might vary from one to four depending upon the type and severity of processing required. This arrangement is expensive in that it involves the use of many separate furnaces and vessels with concomitant valves, steam lines, purge systems, safety valves, etc. and is particularly undesirable for units of small capacity.

As previously indicated, the present invention involves improvements in the reforming of naphthas catalytically and substantially isothermically for quality improvement to include the production of hydrogen which is available for use in other processes, such as hydrodesulfurization, by the use of a tubular reactor contained in a furnace designed to preheat the charge stock and the recycled hydrogen, as well as to supply the heat of reaction. While basically, the isothermal hydroforming process is old, the novelty of the present invention resides in the particular arrangement of equipment which will allow mixed catalyst operation, e.g., treatment with platinum-containing catalyst during the first stage followed with a treatment using a molybdenum-containing catalyst or vice versa, control of heat input to the different sectors of such a heater-reactor, use of tubes without catalyst for heat input control purposes, and the application of the over-all technique outlined for the manufacture of hydrogen as the main product from the naphtha feed. In many refineries there are hydrogen requirements. For example, many hydrocarbon oils contain substantial quantities of sulfur, and if these oils are to be processed in a catalytic operation, the sulfur deactivates the catalyst in a relatively short period of time. Consequently, in dealing with sulfur-bearing stocks which are to be treated catalytically in subsequent operations, the said feed stock is subjected to a mild hydrogenation to convert the sulfur in the feed stock to volatile sulfur compounds, such as $H_2S$. As is known, the hydroforming process invariably results in a net production of hydrogen over and above that required for the hydroforming operation itself, and this excess hydrogen may be used to hydrodesulfurize hydrocarbon oils. The "package" type equipment for the above purposes would enable the construction of very small size units at low cost.

In brief compass, the present invention involves the use of a system comprising a single furnace containing the necessary heating, reaction, and reheating steps with the hydrocarbons and hydrogen flowing through heated tubes, which not only eliminates the added expense of the multiple pieces of equipment, but also permits operation at essentially isothermal conditions, which latter type of operation reduces the quantity of catalyst required in the process and effects an improvement in gasoline yields as well, due to the fact that the naphtha is not preheated to thermal cracking conditions. A further result of the present process is that the catalyst will possess a longer useful life due to the fact that the process is carried out under substantially uniform temperature conditions with no portion of the catalyst being heated above the average temperature level required for good operation.

In comparing the present invention with prior practice, it is pointed out that in the conventional operation, naphtha is pumped into a hydroforming unit at a pressure of, say, about 540 p.s.i.g. and at a temperature of about 105° F., and then mixed with hydrogen recycle gas at about the same pressure level but at a slightly higher temperature. This mixture enters heat equipment where, by heat exchange with hot product, it is heated to a temperature of about 720° F. The preheated mixture is then passed through a furnace where its temperature is increased to about 965°. This mixture at about 960° F. and a pressure of 517 p.s.i.g. is then passed over the first fixed bed of catalyst (say, a platinum-alumina catalyst) where the hydroforming reaction occurs, and the temperature falls rapidly in this first stage so that the mixture of naphtha and recycle gas passes from the first stage at a temperature of about 843° F. This effluent stream is then passed through a furnace coil or other heating means where it is reheated to a temperature of about 965° F., and thereafter passed through another catalyst-containing adiabatic reactor from which it is withdrawn at a temperature of about 859° F. This reactor effluent then passed through heat exchange equipment previously mentioned and cooling equipment, and finally into a gas separator system where the recycle gas is separated from the reformed naphtha product. A portion of the gas is recycled through the system and the excess gas is bled off to a gas collection means. The naphtha product is delivered to conventional stabilization and fractionation in a product recovery system.

In the process embodying the present invention, the auxiliary steps of the conventional process, such as gas separation, heat exchange, product and gas cooling, stabilization, fractionation, etc., are the same as in the conventional system, but the present improvements are in the furnace-tubular reactor system. The combined naphtha and recycle gas is passed through the conventional heat exchange equipment in heat exchange with hot product, and is withdrawn therefrom at a temperature of about 720° F. and enters the reactor tubes of the combination furnace-tubular reactor. After preheating to a temperature of 920°–930° F., thereby avoiding thermal cracking as would occur in the conventional system, the mixture is forced through tubes located in the furnace and acquires additional heat by firing heaters located in the reactor. The reaction continues under substantially isothermal conditions at about 920° F. until completed, and the effluent from the furnace-reactor is delivered to the heat exchange equipment and the other steps previously outlined.

A modification of the present invention involves utilization of alternate banks of tubes containing no catalyst with banks of tubes containing catalyst in order to avoid excessive rates of heat input to the tubes containing catalyst. The naphtha in this modification is reheated in the tubes containing no catalyst. This modification would be particularly desirable where highly naphthenic feeds were being processed over very active catalyst, such as a platinum-containing catalyst, at high space velocities due, of course, to the fact that the dehydrogenation of the naphthenes to the corresponding aromatics is a highly endothermic reaction. Also following treatment of the naphtha in the presence of a platinum-containing catalyst, the naphtha may be treated in tubes containing a molybdenum catalyst.

A further modification of the present invention involves passing the naphtha and recycle gas mixture through the catalyst-containing tubes in parallel banks to avoid high pressure drops and reduce compression and pumping expense.

A suitable method for arranging the tubes in a single piece of heater equipment would be to dispose them in a cylindrical case around the inner surface of the wall of said case, the said tubes extending in a vertical direction. A centrally disposed refractory baffle arrangement provides means for dividing the interior of the case into a plurality of sectors or zones and also provides means for maintaining the various sectors at different temperature levels by manipulation of the heat-supplying means which latter may be individual burners disposed at a lower point in the said sectors or zones.

Among the objects of the present invention are the following:

(1) The present invention provides a cheaper unit for processing hydrocarbons and finds particular useful application in relatively small scale operations.

(2) The process provides means for preventing thermal degradation of feed stocks by avoiding overheating of the feed stock in preheat furnaces, or the like, and this further results in:

(a) A longer catalyst useful life when the operation is catalytic.

(b) Increased yields of desired product.

(3) The present improvements require less and cheaper equipment.

(4) The present improvements are adapted for use in hydroforming of high sulfur feed stocks to produce excess hydrogen suitable for use in other processes requiring hydrogen.

(5) The present process is adapted for mass production techniques for use in low capacity installations.

In accordance with the present invention, therefore, means are provided for providing a relatively small scale hydroforming plant which may be operated under conditions approaching isothermal operation, may be operated without preheating the naphtha to thermal cracking temperatures and otherwise avoiding the insufficiencies of the larger plants.

In the accompanying drawings, Fig. 1 represents an elevation partly in section of a furnace-tubular reactor contemplated by the present invention; Fig. 2 represents a cross-section taken through the line A—A of Fig. 1, and Fig. 3 represents a cross-section taken through the line B—B of Fig. 1.

Fig. 2 shows the tubes 2 disposed peripherally about the inner surface of the wall of reactor 1 and the four zones, namely, *a*, *b*, *c* and *d* formed by baffles 6 and 7.

Fig. 3 shows disposed in the bottom of reactor 1, heating means comprising burners 8.

There is open communication between the four zones, as shown, in Figs. 2 and 3.

Referring to Figs. 1, 2 and 3, the tubular-furnace reactor shown consists essentially of a cylindrical case 1 containing tubes 2 which, in the modification shown, are disposed in close proximity to the inner surface of the vertical wall of reactor 1. The tubes are interconnected to provide a continuous path for a flowing gasiform or vapor material.

The tubes 2 contain a hydroforming catalyst which is stationary, the individual pieces of which are preferably in the form of pills, tablets, pellets, sphere-shaped bodies or coarse granules. The pieces may be of a size or bulk corresponding to, say, an aspirin pill. As indicated, the reactor is provided with a feed inlet pipe and a product withdrawal pipe 4. With respect to tubes 2, the same need not be disposed in the manner shown and described hereinbefore. Thus, the said tubes may be disposed in any convenient position within the spaces *a*, *b*, *c* and *d* formed by intersecting baffles 6 and 7 (see Fig. 2). In the interest of lower pressure drop, the said tubes may be disposed in reactor 1 in such a manner as to permit parallel flow of gasiform material and vapors through said tubes. The baffles 6 and 7 are so disposed and arranged as to permit communication between spaces or zones *a*, *b*, *c* and *d*. At a lower point in each of zones *a*, *b*, *c* and *d*, there are burners 8 to which air and a fuel are supplied to cause the formation of hot fumes which fumes pass upwardly in reactor 1, imparting heat to the tubes 2. The fumes are withdrawn through pipe 5.

In operation, naphtha and hydrogen are fed into the reactor shown in Fig. 1 through line 3, thence passed downwardly through tubes 2 where it contacts catalyst under substantially isothermal hydroforming conditions. The naphtha and the hydrogen then pass upwardly through the riser portions of the tubes and this flow is continued until the naphtha and hydrogen pass through all of the tubes. Heat is supplied from burners 8 to maintain conditions necessary for hydroforming. The product is withdrawn through pipe 4.

As an alternate procedure, some of the tubes 2 may not contain catalyst and in these tubes hot gases from the burners 8 serve to heat the oil and hydrogen to maintain the oil at hydroforming temperature conditions.

In order to give a specific example of the invention, the following is set forth.

EXAMPLE I

A naphtha feed having the following inspection is treated in the above-described apparatus:

Inspection of feed

Boiling range __ 260°–315° F. V.T. (true boiling point)
Vol. percent naphthenes _____ 47
Vol. percent paraffins _____ 41
Vol. percent aromatics _____ 12
Research octane number _____ 50

Conditions in reactor 1

Catalyst composition ____ 0.6 wt. percent platinum on eta-alumina base.
Temperature _____ [1] 920° F.
Pressure _____ 400 p.s.i.g.
Feed rate of oil _____ 3000 b./s.d.
Standard cubic feet of hydrogen fed to reactor 1 per barrel of oil _____ 6000 s.c.f./b.
Concentration of hydrogen _____ 90 mol percent.
Cubic feet of recycle hydrogen _____ 18 MM s.c.f./s.d.

[1] Temperature should be increased gradually with time to counteract catalyst deactivation.

Results

The product obtained had the following inspection:

Vol. percent C₅+ _____ 88.
Vol. percent aromatics _____ 55.
Research octane rating _____ 92 clear.

It can be seen from the foregoing that unlike the adiabatic operations, the feed need not be preheated to a temperature such as would cause thermal cracking. It can further be seen that in a compact unit described above, the reaction may be maintained under substantially isothermal conditions, which is highly desirable in a highly endothermic reaction such as hydroforming.

It will be understood, of course, that the foregoing example merely illustrates the invention without imposing any limitation on the invention. Thus, the catalyst, for example, may be any noble metal carried on alumina, preferably, an eta form of alumina, that is to say, the catalyst may be platinum, palladium, or another hydrogenation-dehydrogenation component, such as moylbdenum oxide carried on alumina. In other words, any of the well known hydroforming catalysts may be employed. Also, the temperatures maintained in the reaction may vary from 850° to 980° F. The pressure may vary from 200 to 800 p.s.i.g. With each barrel of feed oil, 2000 to 6000 s.c.f. of $H_2$, having a purity of 60-75%, may be fed to the reactor. It may be also desirable to include a small amount of chlorine in the platinum or palladium-containing catalyst. In this same connection, it may also be desirable to include some chlorine in the feed, say, 20 p.p.m.

As used herein, the words "substantially isothermal" signify that the drop in temperature as the reactants pass through the tubes containing catalyst is not greater than, say, 15°-30° F., but it may amount to a value within these limits. It is within the purview of this invention, as previously pointed out, to cause the hydrocarbon to be hydroformed and the hydrogen to pass through tubes containing catalyst, and during such passage there may be a small drop in temperature, whereupon the reactants are forced through "empty" tubes which do not contain catalyst and these tubes may be positioned in one of the zones, say, zone B where hot gases from the burners add heat to the tubes not containing catalyst whereby the reactants are reheated and thence charged to, say, zone C where, again the hydrocarbon reactants are forced through catalyst containing tubes. Thus, the process herein proposed maintains the reactants at fairly constant temperature but during preheating always below the temperatures at which thermal cracking occurs. In the interest of reducing pressure drop, the hydrocarbons to be hydroformed may be passed through the tubes in the reactor in parallel rather than in series.

In a trip through tubes containing catalyst and, alternately, through "empty" tubes, that is, tubes which do not contain catalyst, the length of the travel path of the reactants through the tubes containing catalyst increases progressively from the reactants inlet to the outlet. In other words, the travel path of the hydrocarbons to be hydroformed through the first tubes containing catalyst may be, say, passage downward through a tube around the bend and up a second tube. This may be defined as one pass. In actual operation and, of course, depending on the activity of the catalyst, the preheated feed entering the reactor may initially contact catalyst during four passes or through eight tubes, whereupon it would be reheated in, say, eight passes or through 16 empty tubes. After reheating, the reactans may be forced through six to eight passes of catalyst containing tubes and after that reheated. This procedure of progressively increasing the travel path may be followed until the desired conversion is accomplished as indicated by the yield octane relationship of the product. It is pointed out in this connection that when the preheated feed contacts the initial tubes in a trip through the reactor, the dehydrogenation of naphthenes present in the feed is very rapid, which means that the temperature drops rapidly and, therefore, the time for a trip through the first tubes should be relatively short. Further down-stream towards the outlet, the travel path of the reactants through tubes containing catalyst should be progressively longer so that the slower reactions, such as isomerization, aromatization and hydrocracking shall have sufficient contact time to complete these reactions.

Numerous modifications of the present invention will be apparent to those who are familar with this art without departing from the spirit thereof.

What is claimed is:

1. The method of hydroforming naphtha in the presence of a catalyst containing a platinum group metal which comprises disposing stationary shaped bodies of the catalyst in a plurality of vertical tubes connected in series and arranged peripherally within a cylindrically walled heating space, said heating space being divided into intercommunicating compartments through each of which separately formed hot fumes of combustion pass exteriorly along the vertical tubes in the same compartment imparting heat to them, forming said fumes by burning fuel with independent control in each of said compartments, feeding a stream of naphtha and hydrogen from an inlet through the interior of the tubes for contact with catalyst therein under hydroforming conditions and absorption of heat transmitted from the hot fumes in the same compartment, and withdrawing hydroformed naphtha with hydrogen as a reaction product stream from an outlet of said tubes through which the product stream makes a final pass.

2. The method in claim 1, in which the stream of naphtha and hydrogen after being contacted with the catalyst within one of said tubes is passed through another of said tubes that does not contain catalyst for increased heat absorption by the stream to compensate for heat loss when contacted previously with the catalyst.

3. The method of claim 1, further characterized in that the stream of naphtha and hydrogen is given longer contact with catalyst in vertical tubes as the stream flows closer to the outlet after passing through a tube that does not contain catalyst.

4. The method of hydroforming naphtha in the presence of a catalyst which comprises passing a stream of naphtha vapor and hydrogen reactants through a series of heating and catalyst zones inside interconnected tubes, heating groups of said tubes in a plurality of heating zones by burned fuel fumes passed through each of said zones with independent control for adding heat by heat exchange to the reactant stream passing through the tubes, and thereby lowering a drop in temperature of the stream of reactants undergoing reaction in passing through a group of tubes containing the catalyst heated in one of said heating zones and preventing overheating of the reactants stream passed through another group of tubes in another of said heating zones.

5. A compact tubular-reactor furnace of the character described which comprises a vertical cylindrical case, a plurality of vertically extending tubes adapted to contain a catalyst, said tubes being disposed in close proximity to the inner surface of the case, vertical intersecting baffle means disposed within said case and extending transversely to near the inner surface of said case and intersecting at the central vertical axis of the case thus forming a plurality of intercommunicating compartments, independently controlled heating means disposed in the lower end of each of said compartments between said tubes and said central vertical axis permitting independent control of tempeature in said compartments, means for supplying a fluid reactant to be treated in said tubes and means for withdrawing a product formed in the said tubes.

(References on following page)

References Cited in the file of this patent

UNITED STATES PATENTS

| | | |
|---|---|---|
| 1,454,609 | Winter | May 8, 1923 |
| 2,086,287 | Towne | July 6, 1937 |
| 2,160,286 | Ruthruff | May 30, 1939 |
| 2,198,545 | Levine | Apr. 23, 1940 |
| 2,250,052 | Rickerman et al. | July 22, 1941 |
| 2,270,715 | Layng et al. | Jan. 20, 1942 |
| 2,394,631 | Neuhart | Feb. 12, 1946 |
| 2,626,204 | Kassel | Jan. 20, 1953 |
| 2,779,716 | Newman | Jan. 29, 1957 |